July 7, 1925.

P. P. FRAZER 1,545,420

MOLDER'S FLASK LIFTING OFF DEVICE

Filed Dec. 8, 1921

Inventor:
Pinkney P. Frazer,
By
Attorney.

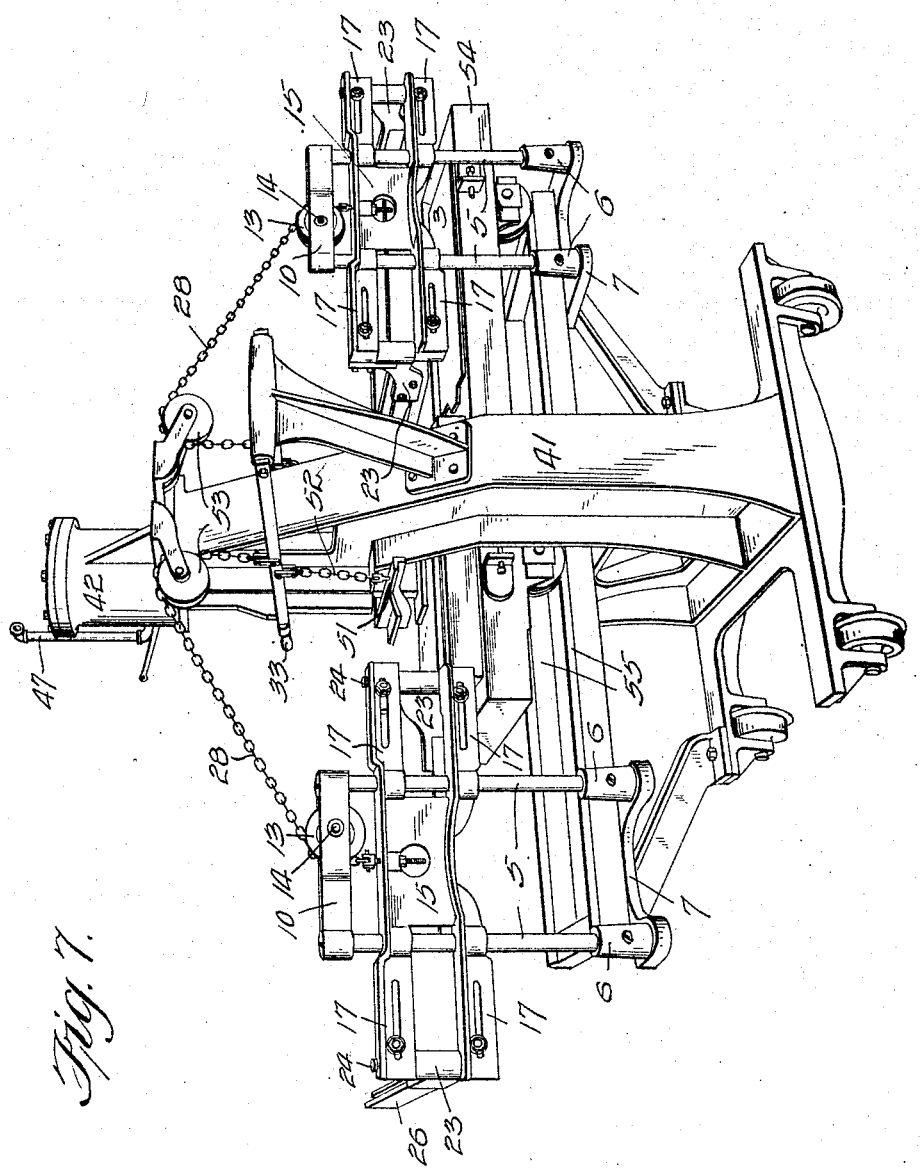

Patented July 7, 1925.

1,545,420

UNITED STATES PATENT OFFICE.

PINKNEY P. FRAZER, OF ST. LOUIS, MISSOURI, ASSIGNOR, BY DIRECT AND MESNE ASSIGNMENTS, TO EDWARD SCHAEFER AND DETLEF F. SCHAEFER, TRUSTEES FOR THE MULTIPLE MOLDING MACHINE CO., OF ST. LOUIS, MISSOURI, A COMMON-LAW TRUST.

MOLDER'S-FLASK LIFTING-OFF DEVICE.

Application filed December 8, 1921. Serial No. 520,833.

*To all whom it may concern:*

Be it known that I, PINKNEY P. FRAZER, a citizen of the United States, residing in the city of St. Louis and State of Missouri, have invented a certain new and useful Molder's-Flask Lifting-Off Device, of which the following is a specification.

My invention relates to a device for lifting a flask and mold from a pattern and supporting same until removed from the device, and, it is a distinct and practical device capable of being applied to any style of molding machine, or applied to a bench or stand for bench molding, so as to overcome certain practical objections to, and defects in, the present method of lifting off flasks and molds, such saving in manual labor insuring a true and straight lift upward from the pattern, lessen the chances of shake outs, or sand drops and eliminating the rapping of patterns before lifting off, thereby insuring more perfect impression in the sand which results in castings being produced truer to size, as the sand is not disturbed after it is tapped or rammed.

A further object of the invention is to provide a lifting off device which may be either power or manually operated.

A still further and important object of the invention resides in the fact that the lifting off device is a device separate and distinct from a molding machine, but may be used in connection with a molding machine, or may be used on straight bench work.

A still further object of the invention is to provide a lifting off device which will be simple and inexpensive in construction, durable, strong, easily manipulated, either by power or by hand, and which will prove highly efficient for the purpose intended.

With the above and other objects in view, the invention consists in the novel features of construction, arrangement and combination of parts hereinafter more fully described and finally pointed out in the claims hereto appended.

Referring to the accompanying drawings forming a part of this specification wherein like characters of reference denote similar parts throughout the several views.

Figure 1:
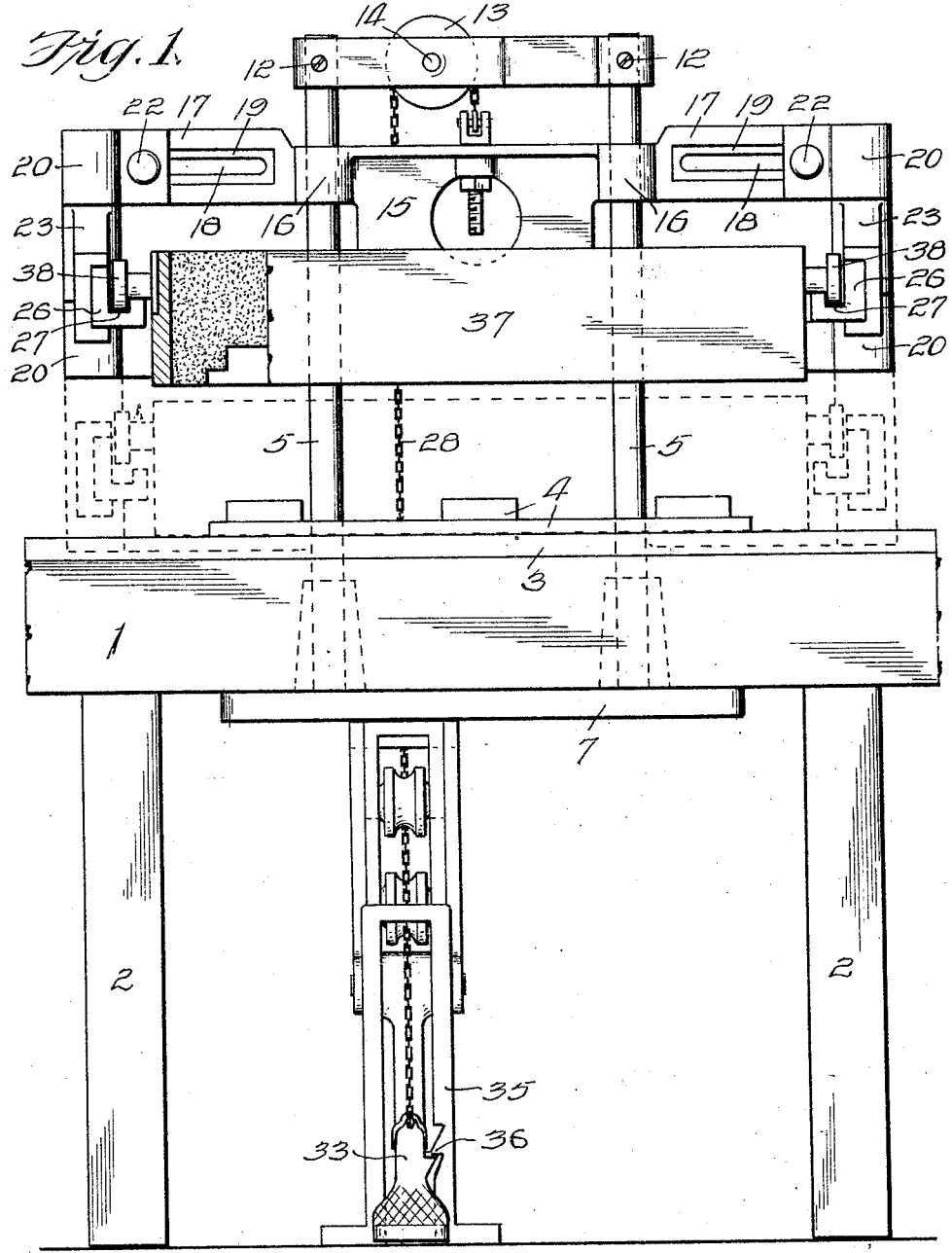
Fig. 1, is a front elevation of a flask and mold lifting off device constructed in accordance with my invention and shown as applied to a molder's bench to be manually actuated.
Figure 2:
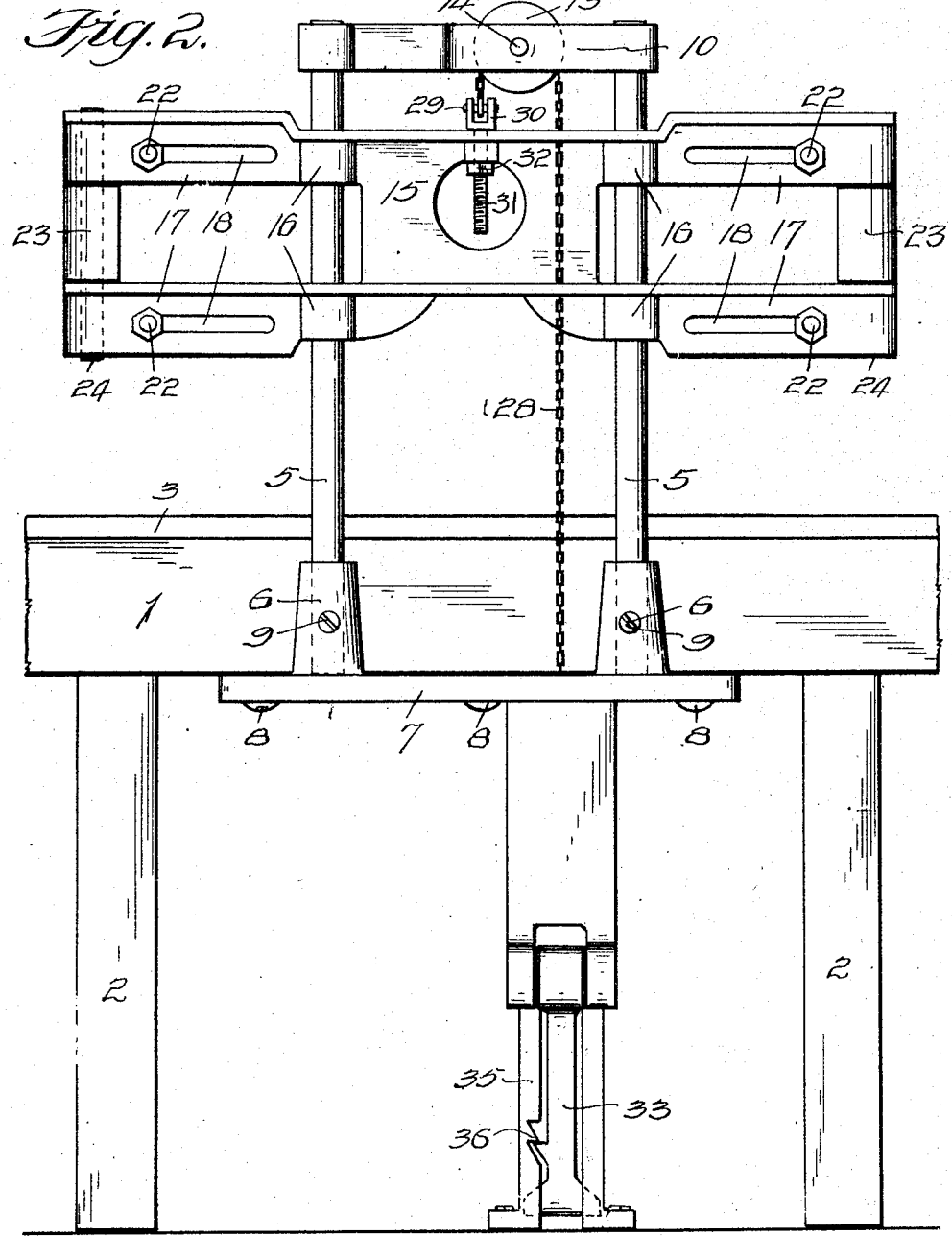
Fig. 2, is a rear elevation of the lifting off device and shown as applied to a molder's bench to be manually actuated.
Figure 3:
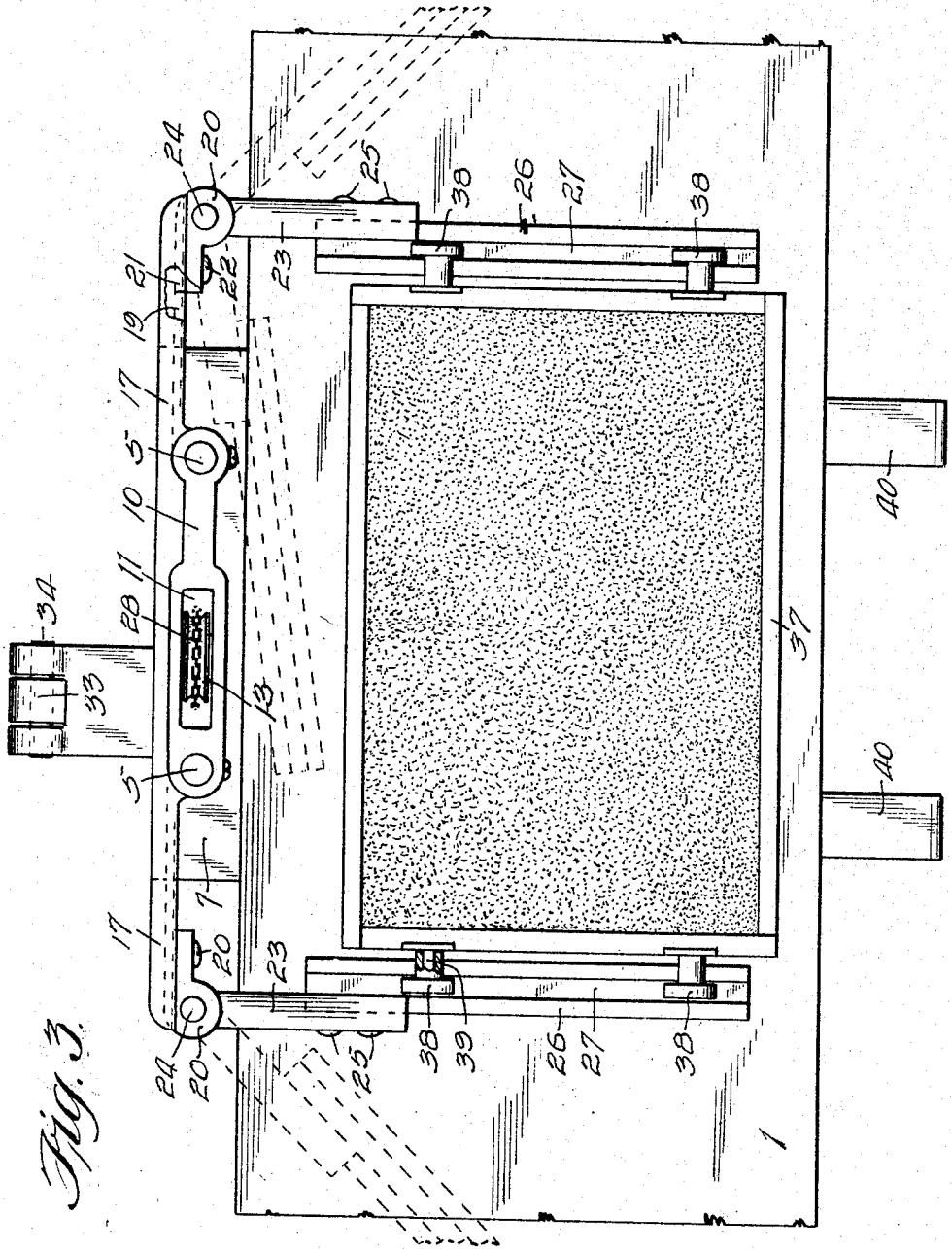
Fig. 3, is a plan view of the lifting off device applied to a molder's bench.
Figure 4:
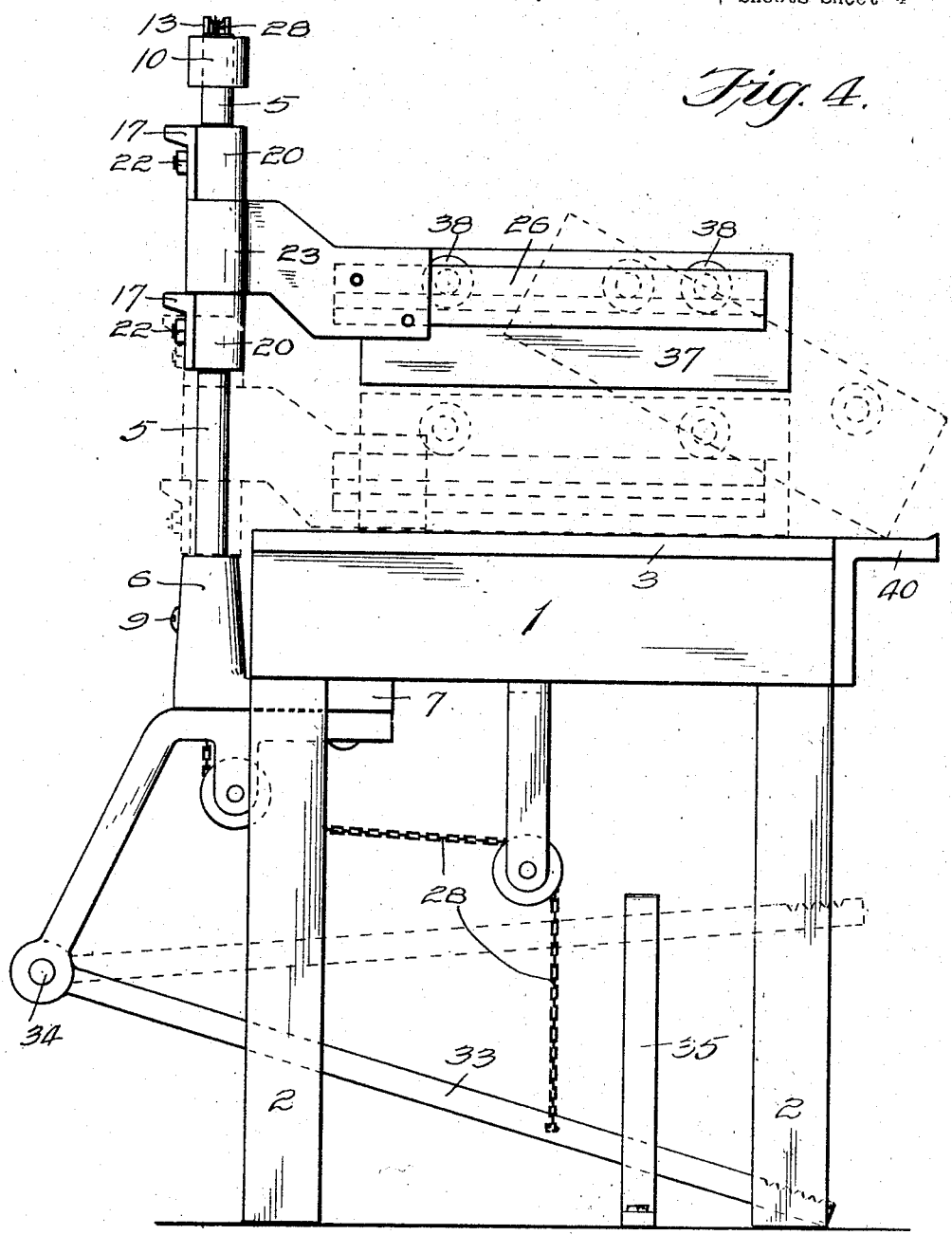

Fig. 4, is an end elevation of the lifting off device applied to a molder's bench. The lifting off device is shown in its uppermost position in full lines. The flask and mold is also shown in dotted lines in its tilted position prior to being turned over in removal therefrom and the flask is still further shown in dotted lines as in its lowermost position prior to being raised, or elevated.

Figure 5:
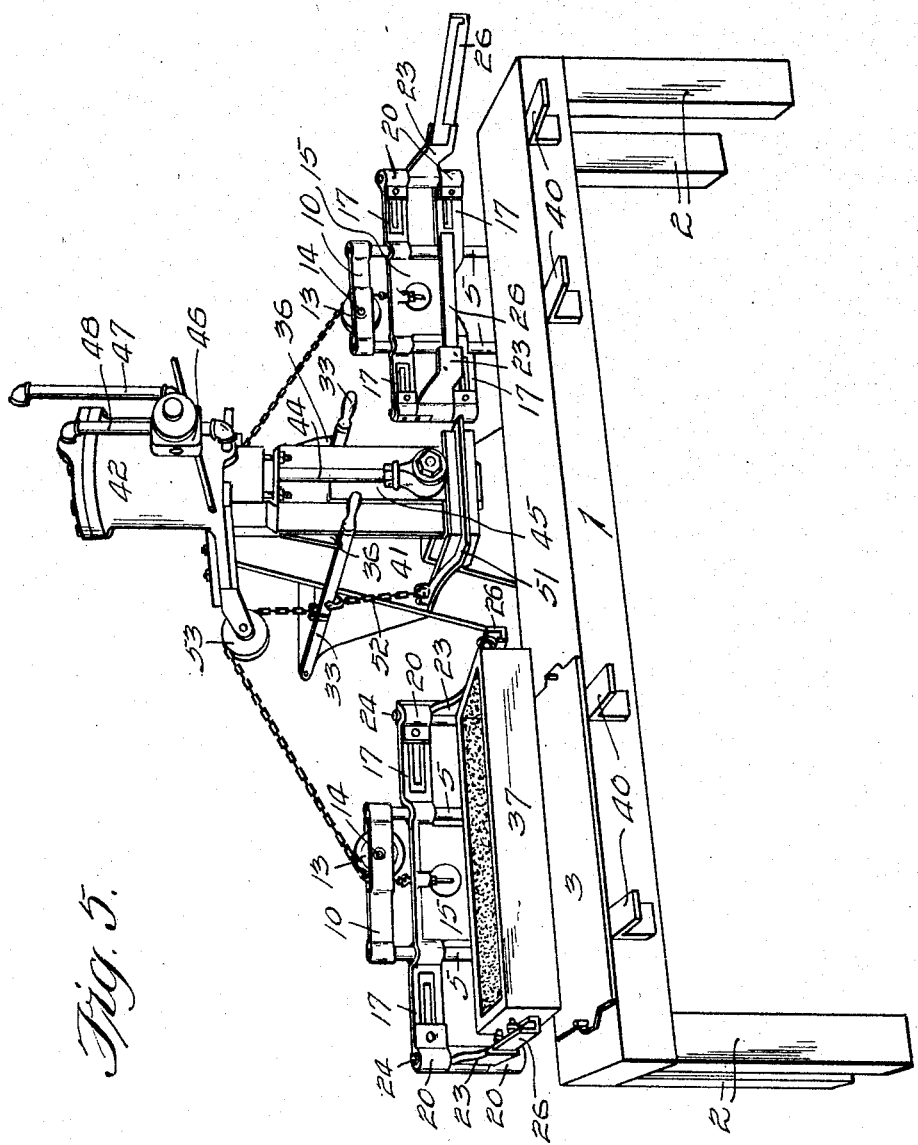

Fig. 5, is a perspective view of the lifting off device arranged in pairs upon a bench and actuated by a source of power, such as air, steam or other fluid under pressure, or by electrical energy.

Figure 6:
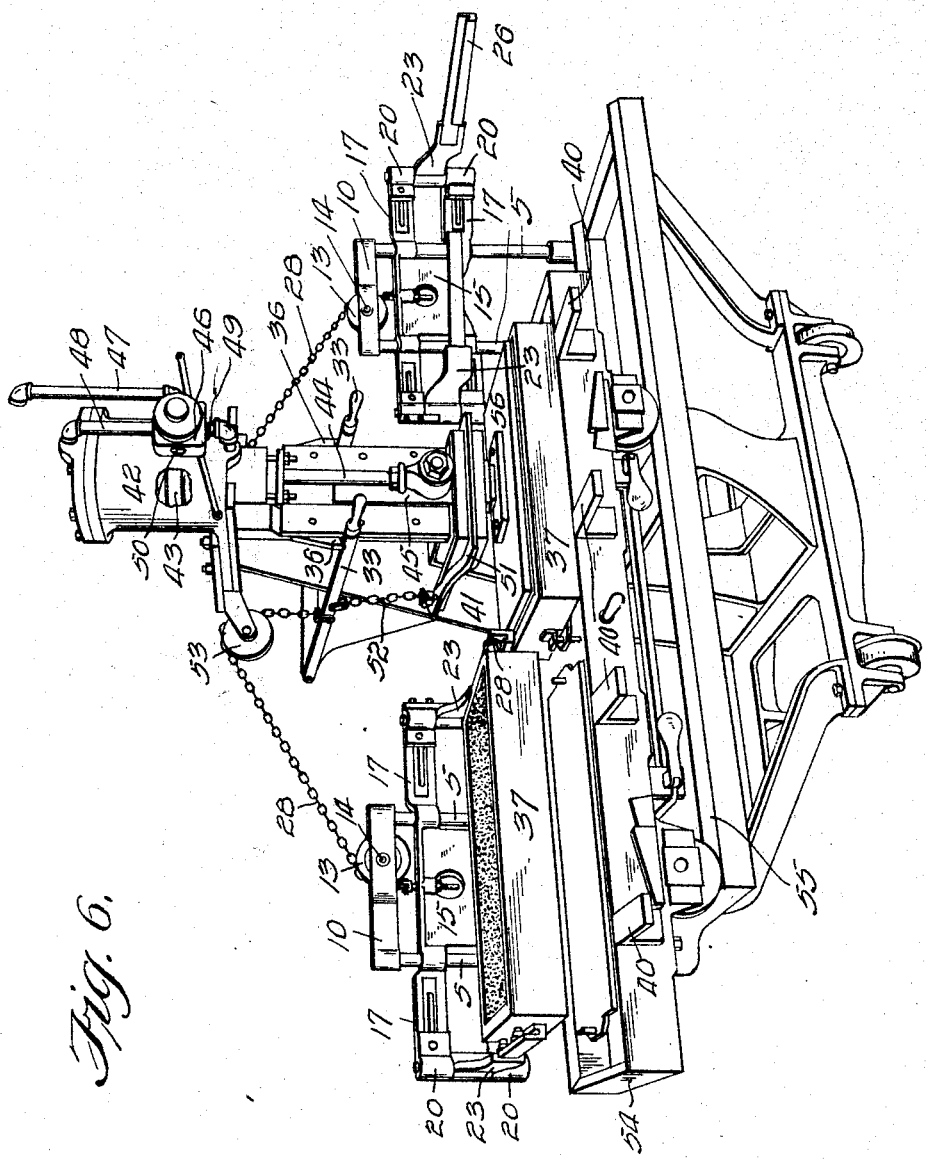

Fig. 6, illustrates the lifting off device as applied to a molding machine having a reciprocating pattern table, the same being a view in perspective from the front.

Fig. 7, is a perspective view similar to Fig. 6, but showing the lifting off device from the rear as it appears applied to a molding machine of the reciprocating pattern table type.

Before describing my particular invention, I first wish to make it clear that my lifting off device is not limited to use in connection with a bench, or molding machine of any special type, but that it is an attachment, or accessory which is applicable to bench use, and use in connection with the various types of molding machines now known to applicant.

By reference to Figures 1 to 5, inclusive, the reference character 1 indicates a suitable bench top provided with suitable supporting legs 2. The bench top 1 may, or may not be provided with a suitable surface plate 3 for supporting a pattern 4 which may be suitably fixed thereto in the usual well known manner.

In carrying out the aim of my present invention, I employ a pair of suitable uprights, standards or guides 5 which are positioned in suitable spaced relation. Each of these uprights 5 is receivable at its lower end in a suitable socket member 6 which is preferably an integral part of a casting in the form of a supporting plate 7, which is suitably fixed to the table or bench top 1 by means of suitable fasteners, such for instance, as bolts 8. The uprights 5 are held or removably fixed in the socket members 6 by means of suitable fasteners, such for instance, as set screws 9. A suitable cross head 10 having an elongated vertically disposed passage 11 is suitably and removably fixed to the upper ends of the uprights 5 by means of suitable fasteners, such, for instance, as set screws 12, for adding rigidity to the uprights 5 and for supporting the pulley 13 which is rotatably supported in the passage 11 of the cross head 10 by means of the pin 14.

A suitable lifting frame 15 is slidably supported by means of the uprights, or guides 5 due to their passage through the bearings 16 of the frame 15. A suitable integral supporting arm 17 extends laterally from each bearing 16 of the lifting frame 15 and is provided with an elongated, or slotted opening 18 and a depressed seat 19.

A suitable bearing 20 is supported by each lifting frame arm 17. Each bearing 20 is provided with a rib 21 to ride in and engage the seat 19 to hold the bearings 20 from possible rotary movement or displacement upon the arms. The bearings 20 are adjustable horizontally upon the arms 17 due to the fact that each bearing is removably fixed to the arm by means of a suitable fastener, such, for instance, as a bolt 22 which passes through the bearings and their respective slots 18 in the arms 17. By this arrangement, it will be observed that each pair of bearings 20 are adjustable toward or away from each other to enable the lifting of various sizes of flask, as will be more clearly understood hereinafter.

A flask supporting arm head 23 is interposed between each pair of lifting frame arms 17 and swingingly or hingedly supported at the free ends thereof by means of the pins 24, which pins are receivable in the bearings 20. Suitably and removably fixed to each head 23, by means of set screws or the like 25, is a flask supporting track arm 26 which is provided in its upper face with a channel, or track groove 27. These arms 26, it will be observed, are free to swing in an arcuate path, so they may be moved, as desired.

28 indicates a chain, cable, or the like, which rides over the pulley 13 carried by the cross head 10. The upper end of the chain 28 is connected to a pin 29 carried by the bifurcated head 30 which is fixed to the upper end of the screw 31, which screw has threaded engagement with the lifting frame 15. The screw 31 is provided with an adjusting lock nut 32 which also acts as a stop and prevents the screw from turning after being adjusted. The screw 31 provides an adjustable connection between the lifting frame 15 and a suitable lever 33 which is pivotally supported at one end, as at 34. The lower end of the chain 28 is connected to the lever 33 at a suitable point intermediate its ends. The lever 33 is to be manually actuated, such as by foot, or hand. 35 indicates a suitable guide member for the lever 33 and is provided with a suitable stop 36 for the lever to engage when the lever is in its lowermost position. The upper end of the lever guide 35 acts as a stop for the lever 33, when the lever is in its uppermost position. It is evident that the lever 33 may be so positioned as to be as easily actuated by hand, as by foot, if desired.

37 indicates the cope or drag of a molder's flask which is provided at each end near the upper edge with a pair of suitable supporting rollers 38, which are carried by pins 39 fixed to and from the end pieces of the flask. These rollers 38 are adapted to be received in the grooves 27 of the track arms 26 when a flask and mold is being lifted off a pattern, as is manifest. It is evident that after the sand has been tamped or rammed in the flask, and, the arms 26 are moved to a position under the rollers 38, that when the lifting frame 15 is raised the flask and mold will also be vertically raised from the pattern, as is manifest.

40 indicates suitable flask rest brackets that are fixed to the front edge of the bench top 1 to rest the front lower edge of a flask 37 upon in removing the flask from the track arms 26. After the front rollers 38 of the flask are removed from the track 26, the rear rollers still remain on the tracks thereby tilting the flask so that in finally removing the flask from the lifting device, it can be easily grasped by the operator for removal.

By referring to Fig. 5, of the drawings, it will be readily seen that two lifting off devices can be arranged in suitable spaced relation upon a bench so that the lifting of the flask may be accomplished by a source of power other than manual, as desired.

When such a source of power as air, steam, or the like, is employed, a suitable standard, or frame 41 is suitably fixed to the bench top 1, or it may be supported by the floor. This standard is provided with a cylinder 42, a double acting piston 43, a piston rod 44 and a reciprocating head 45 to which the lower end of the piston is connected. 46 indicates a suitable four way valve which is provided with the main inlet pipe 47. 48 and 49 indicate the intake pipes leading from the valve to the cylinder, while 50 indicates the exhaust port. 51 indicates a U-shaped arm suitably fixed to plunger head 45 and connecting this arm with each lever 33 is a short chain 52. Chain 28, as shown in Figs. 5 to 7, extends from the lever 33 to the lifting frame 15, but rides over an additional pulley 53 rotatably supported by the standard 41.

With this form of means, it will be observed that when the track arms 26 are down and under the flask rollers, that a downward movement of the piston will cause the lever 33 to be actuated through chain 52 thereby pulling on chain 28 and raising or lifting the frame 15, arms 26 and the flask including the mold therein, as is manifest.

To lower the lifting frame 15 after either one of them has been raised, the operator causes piston 42 to return to its uppermost position which causes a slack in chain 52. After this operation, the operator releases the lever 33 from the stop 36 and the lifting frame 15 will, due to its weight, move into its lowermost position for another lifting operation. In lowering the frame 15, the track arms 26 are swung out so as not to strike the flask, as is manifest.

When my lifting off device, or attachment is employed with a molding machine, such, for instance as the type illustrated as having a reciprocating pattern table, or carriage 54 mounted upon a supported table track 55, it will be observed that when the pressure plate 56 presses the sand within one flask, that the same movement of the piston will raise the other flask and mold from its respective pattern, and vice-versa, as is manifest. The means for releasing or lowering the lifting frame 15 when used in connection with a molding machine, is the same as illustrated in Fig. 5.

It is evident from the foregoing description, that I provide a lifting off device which can be used on the bench, or in connection with a molding machine, one that is simple in construction and operation, strong, durable and highly efficient for the purpose intended.

The many advantages of the herein described invention will readily suggest themselves to those skilled in the art to which it appertains.

I do not wish to be understood as having limited myself to the details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications as may fairly fall within the scope of the appended claims when fairly construed.

What I claim is:

1. In combination with a pattern supporting table and a molder's flask, of means for lifting the flask from the pattern without disturbing the sand of the mold after it has been rammed within the flask and means for forwardly moving the flask including the mold therein after lifting the same from the pattern supporting table.

2. In combination with a patern supporting table and a molder's flask, of a pair of guides fixed to said table extending upwardly therefrom, a lifting frame slidably carried by said guides, a track arm pivotally connected at its rear end to each end of the lifting frame, said arm being provided with a longitudinal channel in its upper face to receive rollers connected to the end walls of the molder's flask, a lever, a flexible connection between said lever and the lifting frame for raising the lifting frame and molder's flask including the mold therein simultaneously to a suitable elevation from the pattern table from which position the flask including the mold can be moved forwardly upon the track arms for removing the flask including the mold therefrom.

3. In combination with a pattern supporting table and a molder's flask, of a pair of guides fixed to said table upwardly therefrom, a lifting frame slidably carried by said guides, track arms hingedly connected to the ends of said frame, means for adjusting said track arms away from and toward each other, said track arms adapted to be connected with the ends of a molder's flask after the sand therein has been rammed to form the impression of a pattern in the sand and means for lifting said lifting-frame, track arms and flask including the mold from the pattern without disturbing the sand forming the mold, and means for holding the lifting frame in its elevated position until it is desired to lower the same.

4. In a device of the class described, vertical guides fixed to a table in spaced relation and directed upwardly therefrom, a lifting frame slidably supported by said guides, a track arm hingedly connected to either end of said lifting frame, and means for elevating the lifting frame, track arms and flask simultaneously to disengage the mold within the flask from a pattern supported by the table.

5. In a device of the class described, vertical guides fixed to a table in spaced relation and directed upwardly therefrom, a lifting frame slidably supported by said guides, a track arm hingedly connected to either end of said lifting frame, means for adjusting said track arms toward and away from each other so as to support molders' flasks of different lengths, and means for elevating said lifting frame for lifting a flask and mold free from a pattern.

6. In combination with a molding machine having a reciprocating pattern supporting carriage, vertically movable lifting means, opposed track arms hingedly connected to said lifting means and means for adjusting said track arms toward and away from each other to accommodate and support flasks of various lengths.

7. In combination with a pattern supporting table and a molder's flask, of means for lifting the flask from the pattern without disturbing the sand of the mold after it has been rammed within the flask and means to permit rolling movement of the flask upon said arms to remove the flask therefrom.

In testimony whereof, I have hereunto signed by name to the specification.

PINKNEY P. FRAZER.